United States Patent
Yamabuchi et al.

(10) Patent No.: US 6,452,533 B1
(45) Date of Patent: Sep. 17, 2002

(54) VEHICLE PERIPHERY MONITORING DEVICE

(75) Inventors: Hiroshi Yamabuchi; Katsuji Matsuoka; Katsuhisa Kodama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/503,116

(22) Filed: Feb. 14, 2000

(30) Foreign Application Priority Data

Nov. 16, 1999 (JP) .......................... 11-325688

(51) Int. Cl.⁷ .................. G01S 13/93; G08G 1/16
(52) U.S. Cl. .................. 342/70; 340/904; 342/175
(58) Field of Search .................. 342/70–72, 175; 340/903, 904, 435, 436

(56) References Cited

U.S. PATENT DOCUMENTS

| | | | | |
|---|---|---|---|---|
| 5,512,901 A | * | 4/1996 | Chen et al. ................ | 342/70 |
| 5,619,375 A | * | 4/1997 | Roberts .................... | 359/584 |
| 5,956,181 A | * | 9/1999 | Lin .......................... | 359/630 |
| 6,081,237 A | * | 6/2000 | Sato et al. ................ | 343/713 |
| 6,193,380 B1 | * | 2/2001 | Jacobs ..................... | 340/903 |
| 6,243,024 B1 | * | 6/2001 | Yamabuchi et al. ...... | 340/903 |

FOREIGN PATENT DOCUMENTS

JP 54-45040 10/1979 .......... B60R/18/00

* cited by examiner

Primary Examiner—Ian J. Lobo
(74) Attorney, Agent, or Firm—Sughrue Mion, PLLC (57) ABSTRACT

A vehicle periphery monitoring device includes a transmitting circuit 3 for generating a transmission wave, an antenna 4 installed on the periphery or in the interior of a door mirror of a subject vehicle for radiating the transmission wave generated from the transmitting circuit as a formed beam having a directivity which propagates over a region expanding over an adjacent lane area from side portions of the subject vehicle toward the rear portion thereof, a receiving circuit 6 for receiving a reflected wave from an object which is in the periphery of the subject vehicle through an antenna 5, an arithmetically operating circuit 2 for arithmetically operating a distance between the subject vehicle and the object on the basis of a period of time required since the transmission wave generated from the transmitting circuit is radiated from the antenna until the transmission wave is reflected by the object and received by the receiving circuit and arithmetically operating a relative velocity from Doppler frequency of a received electric wave or a value of differential from an arithmetically operated distance to judge the risk of collision with the object on the basis of those arithmetically operated results, and LEDs 7 and 8 for announcing the judgement result of the arithmetically operating circuit 2 to a driver in response to the risk.

6 Claims, 8 Drawing Sheets

VEHICLE PERIPHERY MONITORING DEVICE

BACKGROUND OF THE INVENTION

1. Field of the Invention

The present invention relates to a vehicle periphery monitoring device which is mounted on a vehicle and monitors a vehicle periphery, and more particularly to a vehicle periphery monitoring device that detects, in a range extending from both sides of a subject vehicle to the rear, the presence/absence of a vehicle which is going to pass on an adjacent lane while coming close to the subject vehicle, or a vehicle which travels together, or the like, and judges whether the subject vehicle can change its lane or join in a main lane, or not, and also monitors the safety and the presence/absence of an obstacle such as a vehicle in the above range in a stationary manner.

2. Description of the Related Art

Up to now, there has been proposed that a radar device is mounted on a vehicle and widely used as a vehicle periphery monitoring device, or an inter-vehicle distance control device or the like.

The radar device mounted on the vehicle as the vehicle periphery monitoring device is so structured as to utilize a fender mirror or a fender portion of the vehicle, for example, as disclosed in Japanese Unexamined Patent Publication No. Sho 54-45040.

However, in the event of actually detecting a vehicle to be detected on an adjacent lane which is going to pass a subject vehicle, when the vehicle to be detected comes close to the subject vehicle at a relatively short distance, there is a case in which a distance of from the subject vehicle to the front most portion of the vehicle to be detected cannot be detected on the basis of the radial beam pattern characteristic of a radar antenna and a geometric condition. In other words, while the vehicle to be detected approaches the subject vehicle in a state where they travel together, a distance to, for example, a rear tire wheel portion which is on a side of the vehicle to be detected is detected. This is because if the vehicle to be detected travels substantially just laterally with respect to the subject vehicle, a detected distance value of a radar is farther than the actual distance to the front most portion of the vehicle which travels together. Therefore, in the above circumstance, the vehicle to be detected which is in a blind point region cannot be appropriately detected, and if the subject vehicle changes its lane, there is the possibility that the subject vehicle collides with another vehicle that travels together, resulting in a very dangerous state.

In addition, in order to judge the risk of the vehicle to be detected which travels at a relatively long distance, it is necessary to judge the risk at a distance as long as possible and at a high speed.

SUMMARY OF THE INVENTION

The present invention has been made in view of the above circumstances, and therefore has an object of the present invention to provide a vehicle periphery monitoring device which is capable of monitoring the risk of collision with an object in the periphery of a subject vehicle over an entire region of from a relatively short distance to a relatively long distance.

In order to achieve the above object, according to the present invention, there is provided a vehicle periphery monitoring device comprising: a transmitting circuit for generating a transmission wave; an antenna installed on the periphery or in the interior of a door mirror of a subject vehicle for radiating the transmission wave generated from the transmitting circuit as a formed beam having a directivity which propagates over a region expanding over an adjacent lane area from side portions of the subject vehicle toward the rear portion thereof; a receiving circuit for receiving a reflected wave from an object which is in the periphery of the subject vehicle through the antenna; arithmetically operating means for arithmetically operating a distance between the subject vehicle and the object on the basis of a period of time required since the transmission wave generated from the transmitting circuit is radiated from the antenna until the transmission wave is reflected by the object and received by the receiving circuit and arithmetically operating a relative velocity from Doppler frequency of a received electric wave or a value of differential from an arithmetically operated distance to judge the risk of collision with the object on the basis of those arithmetically operated results; and announcing means for announcing the judgement result by the arithmetically operating means to a driver in response to the risk.

Also, the arithmetically operating means, if the arithmetically operated distance is equal to or less than a given value, operates the announcing means to announce that the object is at a relatively short distance from the subject vehicle.

Further, it is characterized in that the arithmetically operating means, if the arithmetically operated distance exceeds the given value, judges a safe inter-vehicle distance according to the arithmetically operated relative velocity, and if the arithmetically operating means judges that an actual distance is shorter than the safe inter-vehicle distance, it operates the announcing means to announce that the actual distance to the object is shorter than the safe inter-vehicle distance.

Still further, it is characterized in that the arithmetically operating means varies a judgement level of the safe inter-vehicle distance according to a weather condition when judging the safe inter-vehicle distance.

Yet still further, it is characterized in that the antenna comprises a plane patch array antenna.

Yet still further, it is characterized in that the announcing means comprises an LED which is disposed on a lower portion of a mirror surface of the door mirror and announces the judgement result by the arithmetically operating means to the driver in response to the risk.

Yet still further, it is characterized in that the door mirror has a mirror surface on which reflective films of three primary colors which reflect the wavelengths of a visible light but transmits the electromagnetic waves of several G to 100 GHz are deposited.

BRIEF DESCRIPTION OF THE DRAWINGS

The novel features of the present invention as well as other features and advantages thereof, will be best understood by reference to the detailed description which follows, read in conjunction with the accompanying drawings, in which:

FIGS. 7A and 7B are explanatory diagrams showing the arithmetically operating contents in the arithmetically operating circuit 2 of FIG. 1, in which

DETAILED DESCRIPTION OF THE PREFERRED EMBODIMENTS

Now, a description will be given in more detail of preferred embodiments of the present invention with reference to the accompanying drawings.

First Embodiment

Figure 1:
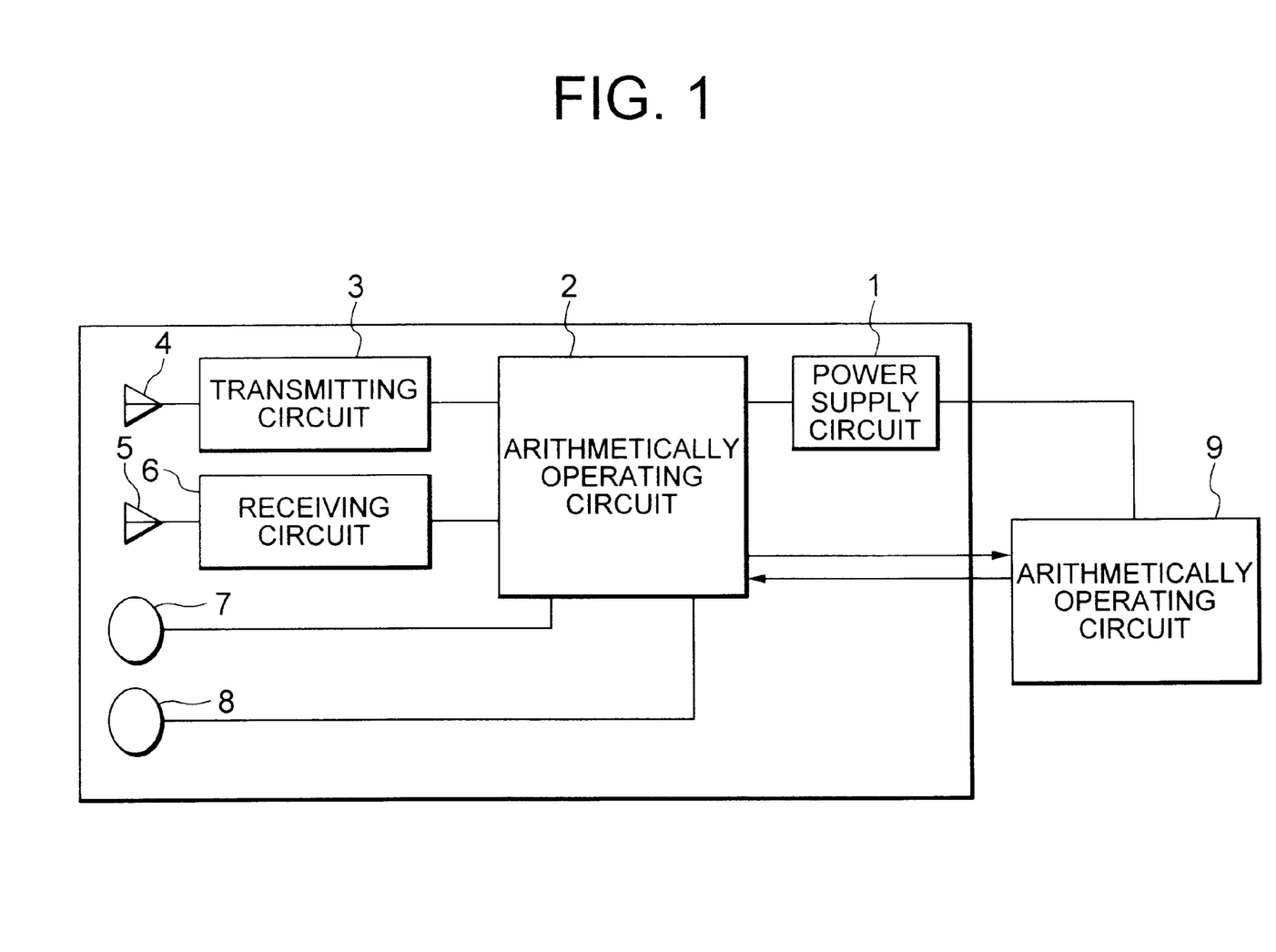
FIG. 1 is a block diagram showing a main structure of a vehicle periphery monitoring device in accordance with the present invention.

FIG. 1 is a block diagram showing a main structure of a vehicle periphery monitoring device in accordance with the present invention.

Referring to FIG. 1, reference numeral 1 denotes a power supply circuit for supplying a power to a radar system, 2 is an arithmetically operating circuit for arithmetically operating a distance between a subject vehicle and a vehicle to be detected and a relative velocity therebetween on the basis of a transmit/receive signal of a radar and judges the dangerous/safe state of collision with the vehicle to be detected, and 3 is a transmitting circuit for generating a transmission wave.

Also, reference numeral 4 denotes a transmission antenna for radiating the transmission wave generated from the transmitting circuit as a formed beam having a directivity which propagates over a region expanding over an adjacent lane area from side portions of the subject vehicle toward the rear portion thereof, 5 is a reception antenna for receiving a reflected wave from the vehicle to be detected which has the same directivity as that of the transmission antenna 4, and 6 is a receiving circuit for amplifying a received signal of the reception antenna 5 and measuring the Doppler frequency of the received signal on the basis of the frequency of the transmission wave.

Further, reference numeral 7 and 8 denote LEDs (light emitting diodes) which announce the result judged by the arithmetically operating circuit 2 to the driver in response to the risk. Reference numeral 9 denotes an arithmetically operating circuit which combines information outputted from this device with information on the vehicle side (not shown) to conduct warning/control at the vehicle side.

The vehicle periphery monitoring device made up of the above power supply circuit 1 to the LEDs 7, 8 is mounted on a door mirror portion so as to detect a substance such as a vehicle which travels on a lane adjacent to the lane on which the subject vehicle travels. Alternatively, an arrangement may be made such that only the transmission antenna 4 and the reception antenna 5 are mounted on the periphery or in the interior of the door mirror of the vehicle, and other structures are disposed on the vehicle side.

Figure 2:
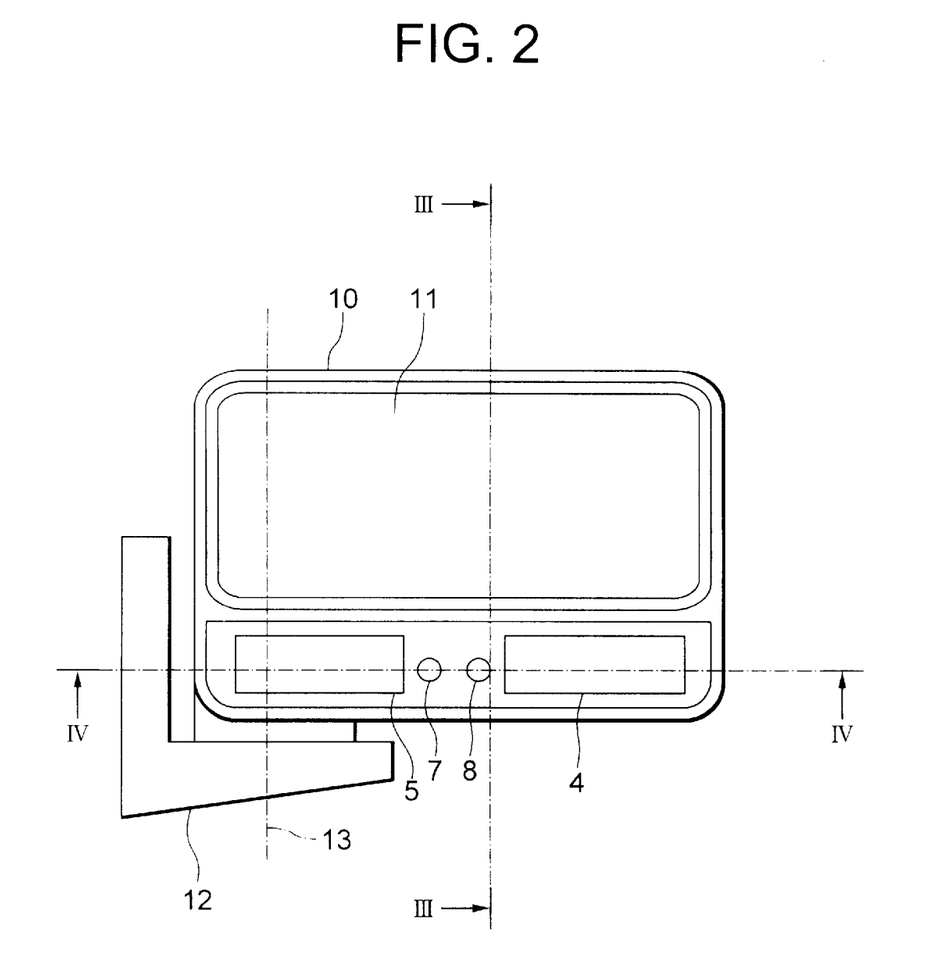
FIG. 2 is a diagram showing an appearance of the vehicle periphery monitoring device in accordance with a first embodiment of the present invention.

FIG. 2 is a diagram showing an appearance of the vehicle periphery monitoring device in accordance with a first embodiment of the present invention.

Referring to FIG. 2, reference numeral 10 denotes a door mirror outer case, 11 is a mirror, 12 is a support for fixing the door mirror to a car body, and 13 is a rotaty shaft for door mirror storing operation.

Figure 3:
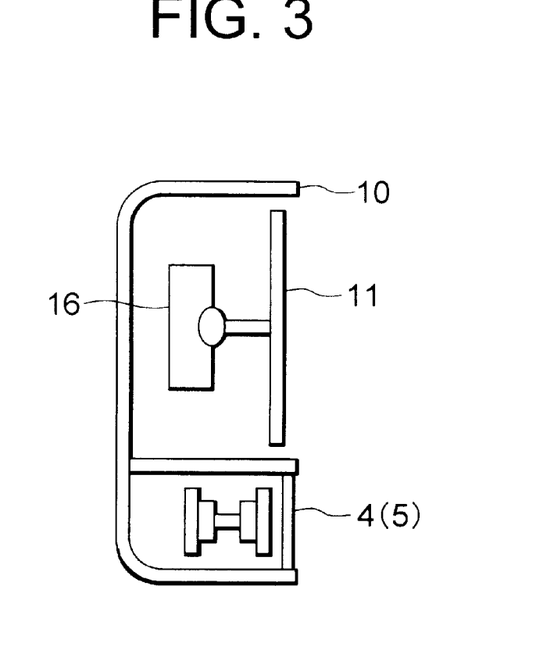
FIG. 3 is a cross-sectional view taken along the line III—III of FIG. 2.
Figure 4:
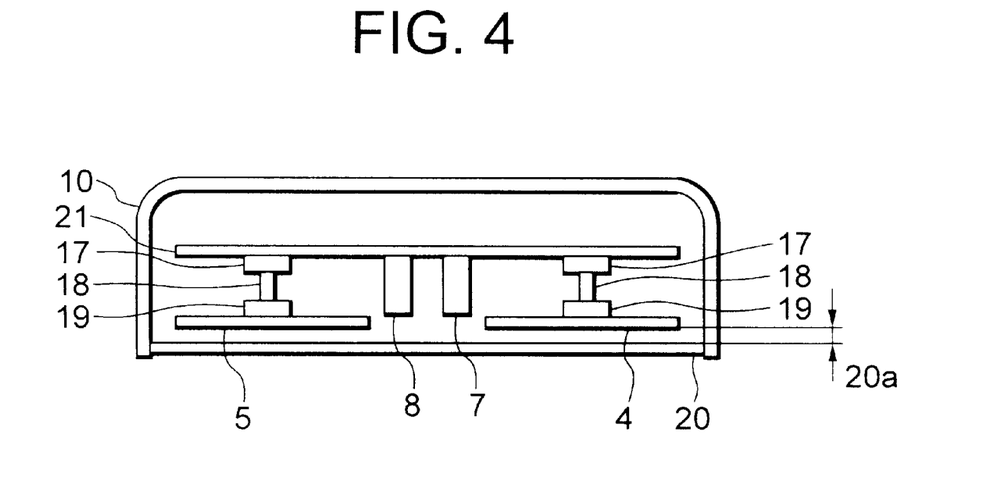
FIG. 4 is a cross-sectional view taken along the line IV—IV of FIG. 2.

FIG. 3 is a cross-sectional view taken along the line III—III of FIG. 2, and FIG. 4 is a cross-sectional view taken along the line IV—IV of FIG. 2.

Referring to those figures, reference numeral 16 denotes an actuator for adjusting an angle of the mirror 11 and a support for fixing the actuator; 17 is a connector disposed on a substrate of a transmitting circuit and a receiving circuit for fixedly connecting a cable 18 that supplies a power to the antennas 4 and 5; 19 is a connector disposed on a substrate of the antennas 4 and 5 for fixedly connecting the cable 18; 20 is a radome which transmits the electromagnetic wave but prevents rain, stain or the like from entering to protect the interior of the device; and 20a is an interval between the antenna 4 or 5 that generates the electromagnetic wave and the radome 20, which is set to 1 wavelength. Reference numeral 21 denotes a substrate that integrates the power supply circuit 1, the arithmetically operating circuit 2, the transmitting circuit 3 and the receiving circuit 6 together.

Figure 5:
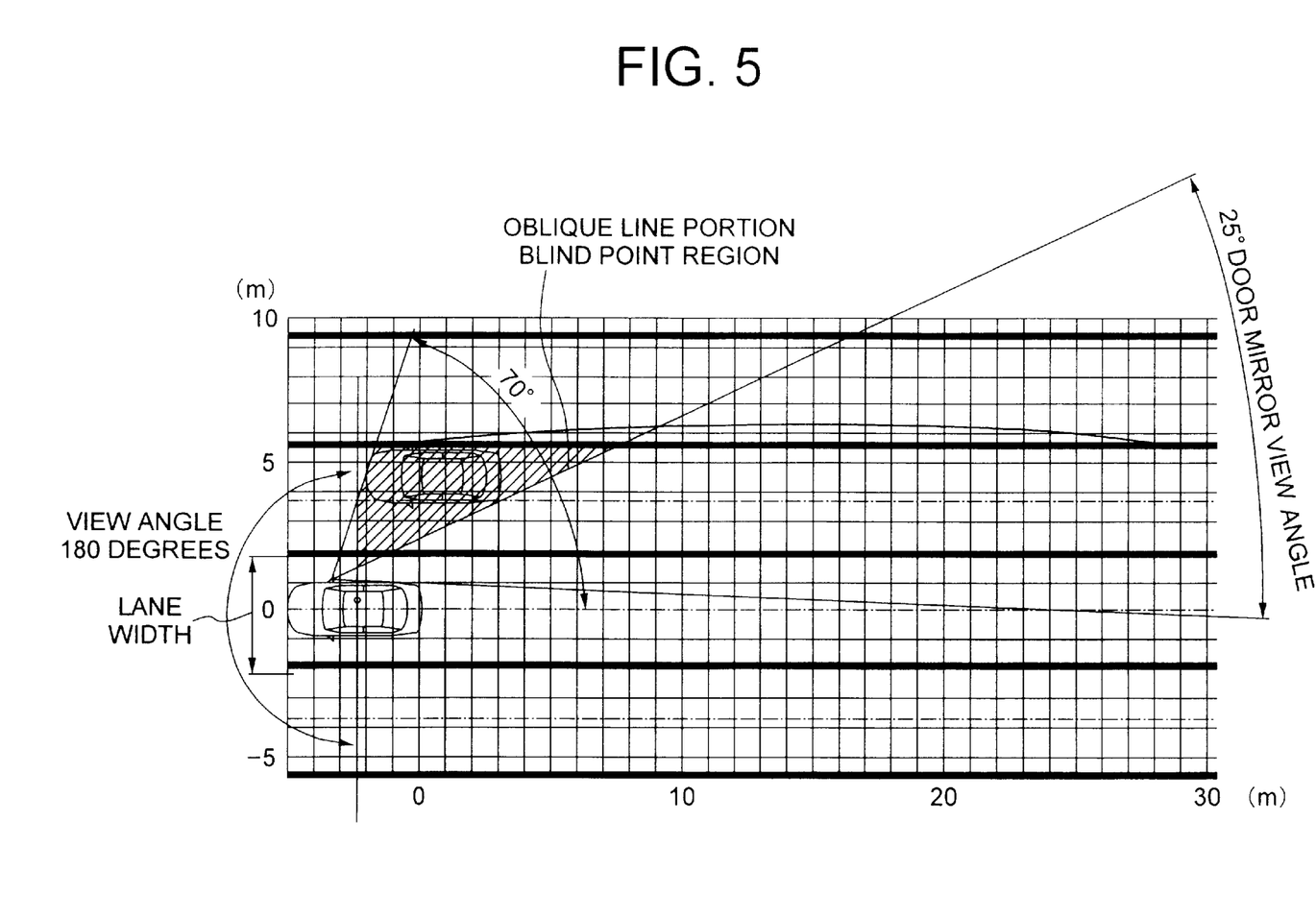
FIG. 5 is an explanatory diagram showing an arrangement and a detecting region when the vehicle periphery monitoring device of the present invention is mounted on the vehicle.

FIG. 5 is an explanatory diagram showing an arrangement and a detecting region when the vehicle periphery monitoring device of the present invention is mounted on the vehicle.

Normally, a range of view angle where monitoring can be made by the door mirror in a horizontal direction is 25 degrees as a standard value. On the other hand, there has been known that a view angle by a driver is generally in a range of 180 degrees. From those viewpoints, a blind point which is a region that is out of a monitoring range of both of a driver's view field and a door mirror's view field geometrically exists.

The range indicated by oblique lines shown in FIG. 5 represents a region where the region of the blind point and a region of the adjacent lane overlap each other and represents that a vehicle which is at a relatively short distance from the subject vehicle is within the blind point region although it exists within the range of the adjacent lane.

Normally, the reason that a driver confirms both sides of the vehicle by his eyes after confirming the rear through door mirrors when changing the lane (which is taught by a driving school) is because the driver confirms the presence/absence of an obstacle within the blind point region corresponding to the oblique line portion.

The antennas 4 and 5 in the vehicle periphery monitoring device according to the present invention is so designed as to provide the directivity which applies the electric wave to at least the blind point region of the above oblique line portion, and has an appropriate radial pattern for monitoring the blind point region. The directivity can suit or optimize the radial pattern with the design parameters of the attaching angle, the number of parts, the mutual interval dimensions, supply power and phases of the respective patch antennas which constitute a known plane patch array antenna.

Figure 6:
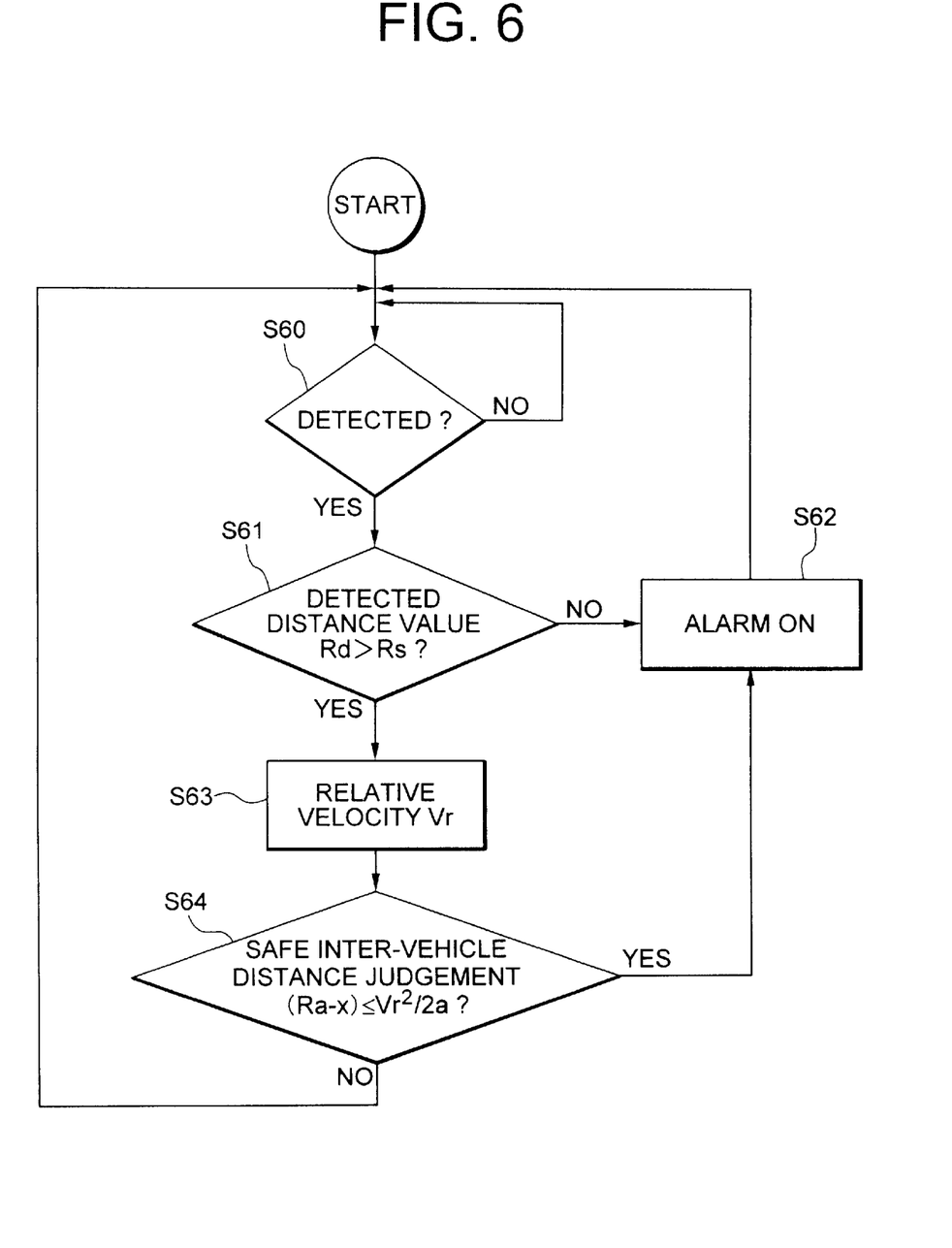
FIG. 6 is a flowchart showing the arithmetically operating contents for judging the risk of a vehicle to be detected in an arithmetically operating circuit 2 of FIG. 1.

FIG. 6 is a flowchart showing the arithmetically operating contents for judging the risk of a vehicle to be detected in an arithmetically operating circuit 2 according to the present invention, and the arithmetically operating contents will be described with reference to FIGS. 7A, 7B and 8.

Figure 7A:
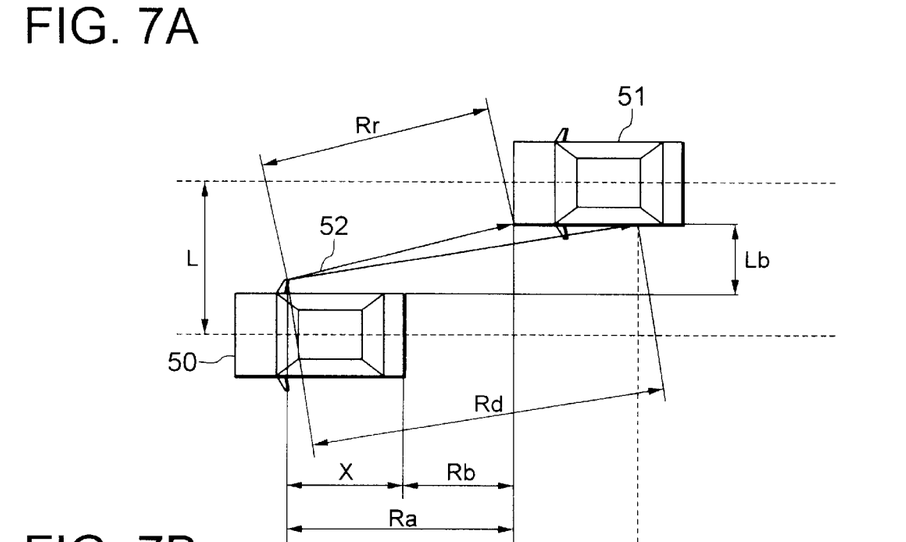
FIG. 7A is a horizontal plan view showing a relative arrangement of a subject vehicle and a vehicle to be detected.
Figure 7B:
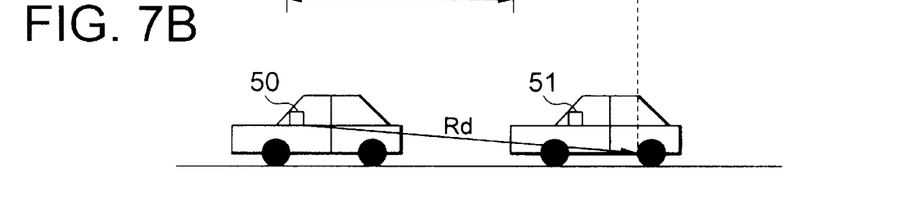
FIG. 7B is a vertical plan view thereof.

Referring to FIGS. 7A and 7B, reference numeral 50 denotes a subject vehicle, 51 is a vehicle to be detected, 52 is a position of an antenna mounted on the door mirror portion of the subject vehicle 50, L is an interval between the subject lane and the adjacent lane, Lb is a lateral interval between the vehicles, Rr is an ideal detected distance which is detected by the radar, Ra is a distance between the antenna and the vehicle to be detected, Rb is a distance between the vehicles, and Rd is a distance value which is actually detected by the radar.

FIGS. 7A and 7B are a horizontal plan view and a vertical plan view in which the vehicle to be detected 51 travels at a relatively short distance from the subject vehicle, and show that because the distance Lb between the vehicles occurs geometrically, the ideal detected distance Rr value is not obtained due to detecting a portion close to the rear wheel of the vehicle to be detected 51 if the vehicle to be detected comes close to the subject vehicle at the relatively short distance, as indicated by the distance Rd which is actually detected by the radar.

This occurs due to a relation between the above-described geometric inter-vehicle interval Lb and a beam of the electromagnetic wave which is radiated from the antenna. In other words, this occurs because the electromagnetic wave beam radiated from the antenna produces a formed beam that radiates the electromagnetic wave over a relatively large range which expands in a region of the adjacent lane from the side of the subject vehicle 50 toward the rear thereof, and this is because a level of the reflected wave from the irradiated portion of the beam which is relatively high in the density of radiated power and is directed backward becomes higher than the reflected level of the electromagnetic wave from the frontmost portion of the vehicle to be detected 51.

The arithmetically operating contents in the arithmetically operating circuit 2 for safely announcing the state even in the above detection state will be described with reference to the flowchart of FIG. 6.

First, in step S60, it is judged whether the vehicle to be detected 51 exists, or not, and a distance between the subject vehicle and the vehicle to be detected 51 is measured. The distance to the vehicle to be detected 51 is measured by a period of time during which the transmission wave generated from the transmitting circuit 3 is radiated from the transmission antenna 4, reflected by the vehicle to be detected 51 and then received by the receiving circuit 6 through the reception antenna 5.

When distance data is actually confirmed, processing is shifted to step S61 in which the detected distance value Rd is compared with a set distance Rs. In this example, the set distance Rs is directed to a distance value detected by a radar at an arrangement in which the detected distance Rr cannot be detected during a process where the vehicle to be detected 51 comes close to the subject vehicle from a relatively long distance, and there is a limit that the detected distance Rd to the side portion of the vehicle to be detected 51 can be detected, from the viewpoint of a fact that the detected distance when the vehicle to be detected 51 is at the relatively long distance from the subject vehicle is equivalent to the substantially ideal detected distance Rr. Actually, the set distance Rs is measured through an experiment and set to 5 m.

In other words, in step S61, the detected distance Rd value and the set distance Rs value are compared with each other, and if the detected distance Rd value is smaller than the set distance Rs value, it is judged that the vehicle to be detected is at a distance close to the subject vehicle or travels together, and processing is shifted to step S62 where alarm turns on, to thereby turn on the LEDs 7 and 8 disposed on the lower portion of the mirror surface of the door mirror as announcing means.

Figure 8:
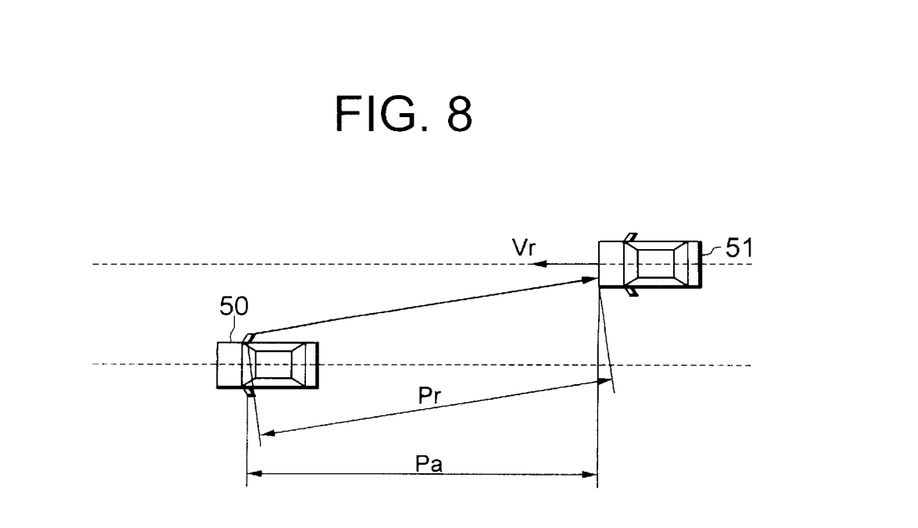
FIG. 8 is an explanatory diagram showing the arithmetically operating contents in the arithmetically operating circuit 2 of FIG. 1, and a horizontal plan view showing a relative arrangement of the subject vehicle and the vehicle to be detected which are at a relatively long distance.

On the other hand, if the detected distance Rd value is larger than the set distance Rs value, the detected distance by the radar becomes the ideal detected distance Rr as shown in FIG. 8. Also, in this case, if the vehicle to be detected 51 exists at a relatively long distance from the subject vehicle, the ideal detected distance Rd and the distance Ra between the antenna and the vehicle to be detected can be made approximate if they are substantially equal to each other.

In this example, if it is judged in step S61 that the detected distance Rd value is larger than the set distance Rs value, processing is then shifted to step S63, in which the arithmetically operating circuit 2 measures a value of the relative velocity Vr with respect to the detected distance value. The relative velocity Vr is measured from the Doppler frequency of the received electric wave as well known, and obtained from a difference between a reference frequency of a reference oscillator (not shown) which is installed in the transmitting circuit 3 and the received frequency of the receiving circuit 6.

If the subject vehicle 50 change its lane to a passing lane while the vehicle to be detected 51 which travels on a passing lane is approaching the subject vehicle 50, the inter-vehicle distance Rb and the safe inter-vehicle distance are compared with each other to judge the risk state in step S64.

That is, in step S64, algorithm that judges safety is represented by the following expression (1):

$$(Ra-x) < Vr^2/2a \tag{1}$$

where Ra is a distance between the antenna and the vehicle to be detected 51, x is a distance between the antenna and the rear end portion of the subject vehicle 50, Vr is a relative velocity, and a is an acceleration (braking deceleration) of the vehicle. That is, since a distance until the relative velocity becomes 0 since the vehicle to be detected 51 is subjected to full braking is $Vr^2/2a$, this distance is set as a safe inter-vehicle distance, and this distance and a distance obtained by subtracting the distance x up to the rear end of the subject vehicle from the actual detected distance Ra are compared with each other so as to judge safety.

If it is judged in step S64 that the actual distance is shorter than the safe inter-vehicle distance, processing is advanced to step S62 in which alarm turns on to flicker the LEDs 7 and 8 which serve as the announcing means. In this way, with the application of the display mode (flickering) of the LEDs 7 and 8 which is different from the display mode (lightening) of the LEDs 7 and 8 which has been subjected to processing of step S61, announce can be made in response to the risk.

The algorithm that judges safety in the above step S64 follows the expression (1), however, the judgement level of the safe inter-vehicle distance may be changed in accordance with the weather condition. In this case, the algorithm that judges safety is represented by the following expression (2):

$$(Ra-x) < Vr^2/(2a \cdot \alpha) \tag{2}$$

where α is a constant that varies according to the weather condition.

This is because of the following reason. That is, since the road surface condition changes at the time of bad weather such as rain or snow and deceleration is deteriorated in the braking operation such that a long distance is required to stop the vehicle, the judgement level of the safe inter-vehicle distance must be changed in response to the longer distance. The constant α is set to a value which is made longer in the safe inter-vehicle distance than that in the good weather condition according to the weather condition such as rain or snow.

Accordingly, in the above first embodiment, the arithmetically operating circuit 2 measures a distance to the vehicle to be detected 51 on the basis of a period of time required since the transmission wave generated from the transmitting circuit 3 is radiated from the antenna 4 until the transmission wave is reflected by the vehicle to be detected 51 and received by the receiving circuit 6 through the reception antenna 5, and also arithmetically operates a relative velocity from Doppler frequency of a received electric wave or a value of differential from an arithmetically operated distance to judge the risk of collision with the vehicle to be detected 51 on the basis of those arithmetically operated results, and announces the judgement result to a driver in response to the risk through the LED 7 or 8 which serves as the announcing means. With the above structure, the risk of collision with an object which is in the periphery of the subject vehicle can be monitored over the entire region of from the relatively short distance to the relatively long distance.

Also, the arithmetically operating circuit 2, if the arithmetically operated distance is equal to or less than a given value, turns on the LEDs 7 or 8 as the announcing means to announce that the vehicle to be detected 51 is at a relatively short distance from the subject vehicle. With the above structure, it can be judged that the vehicle to be detected 51 is at a close distance or in such a state as to travel together.

Further, the arithmetically operating circuit 2, if the arithmetically operated distance exceeds the given value, judges a safe inter-vehicle distance according to the arithmetically operated relative velocity, and if the arithmetically operating circuit 2 judges that an actual distance is shorter than the safe inter-vehicle distance, it turns on the LED 7 or 8 as the announcing means to announce that the actual distance to the vehicle to be detected 51 is shorter than the safe inter-vehicle distance. With the above structure, the safe inter-vehicle distance judgement can be instantly conducted on the vehicle to be detected which is at the relatively long distance on the basis of the distance and the relative velocity.

Still further, since the arithmetically operating circuit 2 varies a judgement level of the safe inter-vehicle distance according to a weather condition when judging the safe inter-vehicle distance, if the road surface condition is varied in a bad weather condition such as rain or snow, the safe inter-vehicle distance can be judged in accordance with the varied road surface condition.

Yet still further, since the antenna is made up of a plane patch array antenna, there is provided the directivity which applies the electric wave to the blind point region, thereby being capable of suiting and optimizing the radial pattern.

Yet still further, since the announcing means is made up of the LEDs 7 and 8 which are disposed on a lower portion of a mirror surface of the door mirror and announces the judgement result by the arithmetically operating circuit 2 to the driver in response to the risk, the safe judgement can be conducted without moving the field of view while viewing the door mirror.

Second Embodiment

Figure 9:
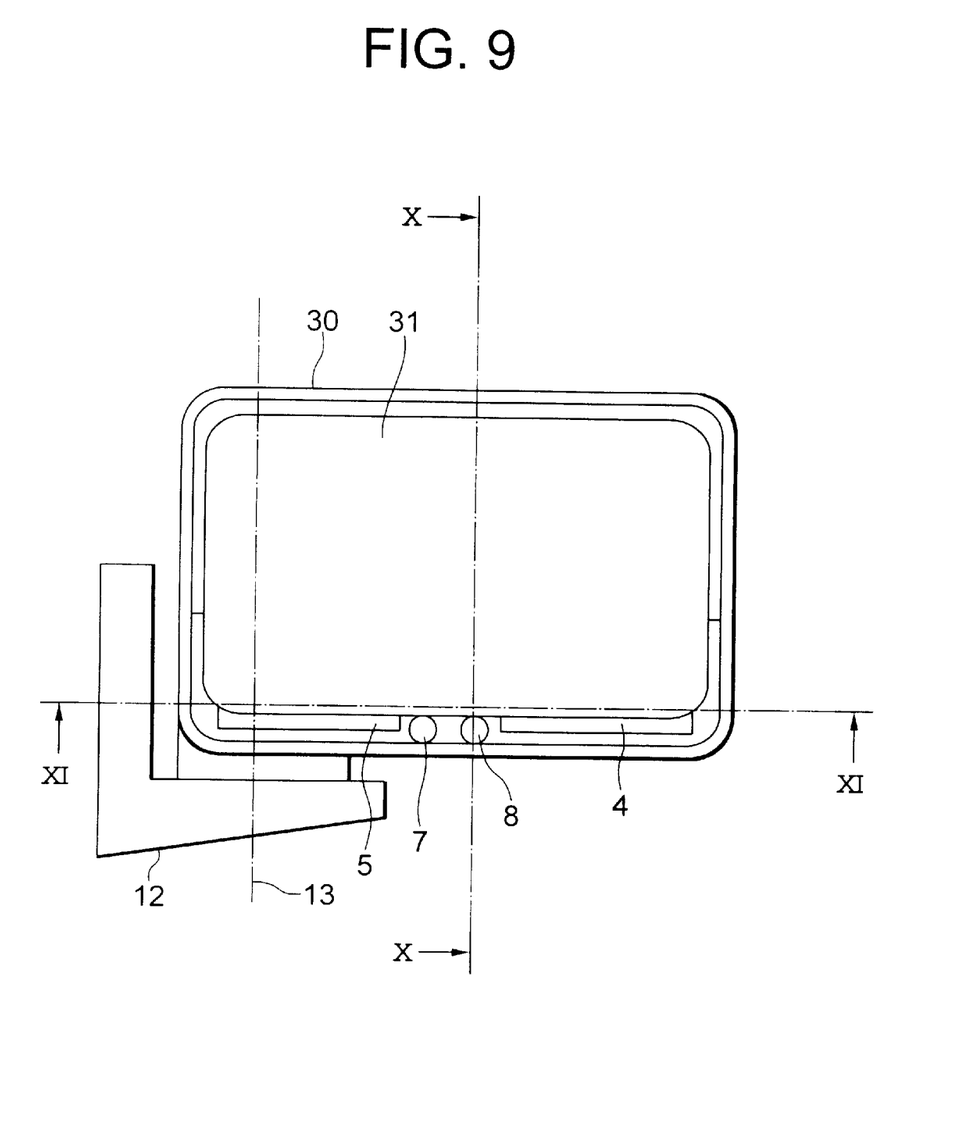
FIG. 9 is a diagram showing an appearance of the vehicle periphery monitoring device in accordance with a second embodiment of the present invention, and a view showing the vehicle periphery monitoring device installed in the interior of the door mirror.

FIG. 9 is a diagram showing an appearance of a vehicle periphery monitoring device in accordance with a second embodiment of the present invention, and a view showing the vehicle periphery monitoring device equipped in the interior of the door mirror except for only the LEDs 7 and 8.

Referring to FIG. 9, the same parts as those in the first embodiment shown in FIG. 2 are designated by the same reference, and their descriptions will be omitted. New reference numeral 30 denotes a door mirror outer case, and 31 is a mirror having a filter characteristic which can reflect a visible light but transmit the electromagnetic wave of several G to 100 GHz.

Figure 10:
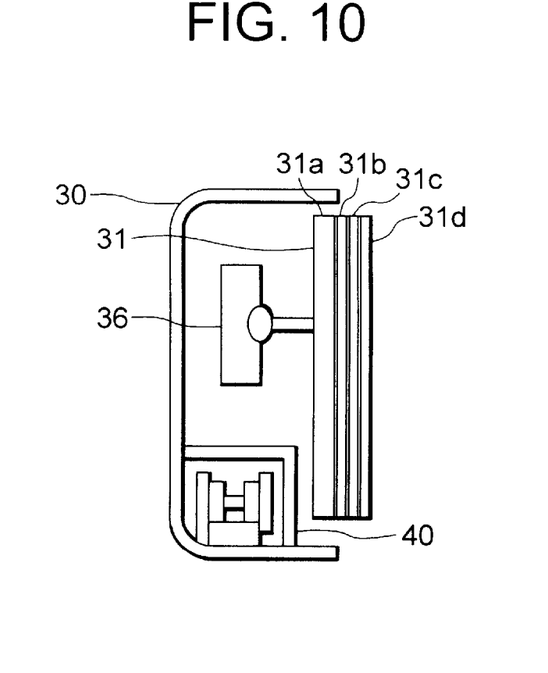
FIG. 10 is a cross-sectional view taken along the line X—X of FIG. 9.
Figure 11:
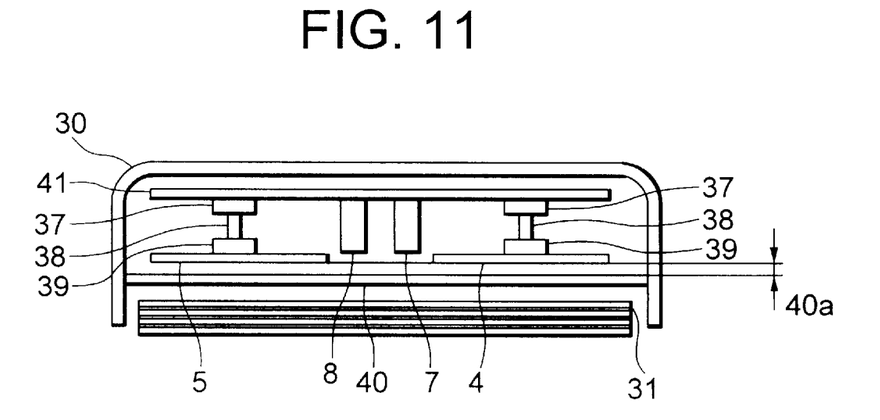
FIG. 11 is a cross-sectional view taken along the line XI—XI of FIG. 9.

FIG. 10 is a cross-sectional view taken along the line X—X of FIG. 9, and FIG. 11 is a cross-sectional view taken along the line X1—X1 of FIG. 9.

In those figures, reference numeral 36 denotes an actuator that adjusts an angle of the mirror 31 and a support that fixes the actuator. Also, the mirror 31 is made of glass (index of refraction is 1.5) as a base material 31a in order to transmit the electromagnetic wave of several G to 100 GHz. In addition, a thin film which is not adversely affected by the transmission of an electromagnetic wave such as a microwave or a millimeter wave, that is, a thin film having a thickness of about ¼ of a visible light wavelength (center wavelength is several hundreds nm) which is a fine dimension in comparison with the wavelength of the electromagnetic wave such as a microwave or a millimeter wave is formed on a surface of the glass 31a of the base material through a deposition manner or the like. Actually, reflective films (31b, 31c and 31d) made up of at least three layers corresponding to three primary colors (wavelengths of 440, 540 and 640 nm) are formed on a surface of the glass base material 31a.

Also, reference numeral 37 denotes a connector disposed on a substrate of a transmitting circuit and a receiving circuit for fixedly connecting a cable 38 that supplies a power to the antennas 4 and 5; 39 is a connector disposed on a substrate of the antennas 4 and 5 for fixedly connecting the cable 38; 40 is a radome which transmits the electromagnetic wave but prevents rain, stain or the like from entering to protect the interior of the device; 40a is an interval between the antenna 4 or 5 that generates the electromagnetic wave and the radome 40, which is set to 1 wavelength. Reference numeral 41 denotes a substrate that integrates the power supply circuit 1, the arithmetically operating circuit 2, the transmitting circuit 3 and the receiving circuit 6 together.

In the second embodiment, the same operation as that in the above-described first embodiment is made, the arithmetically operating circuit 2 also operates in accordance with the flowchart shown in FIG. 6 so as to judge the risk of collision with a vehicle to be detected and to announce the risk through the LEDs 7 and 8 as the announcing means. Also, since the reflective films 31b, 31c and 31d of three primary colors which reflects the wavelengths of a visible light but transmits the electromagnetic wave of several G to 100 GHz are deposited on the mirror surface of the door mirror, even if the vehicle periphery monitoring device is mounted on the interior of the door mirror, it can transmit the necessary electromagnetic waves but reflect the visible light.

As described above, according to the first and second embodiments, the detection of an obstacle by the radar, the judgement of collision with the obstacle and the degree of danger/safety can be instantly indicated and communicated to the driver, and the risk of collision with an object which is in the periphery of the vehicle can be monitored over the entire region of from the relatively short distance to the relatively long distance.

Also, even a region of the blind point of the door mirror at sides of the vehicle which are usually safety-confirmed directly by driver's eyes when changing the lane to another lane, etc., can be monitored in the stationary manner, and in addition, if a dangerous state is judged, alarm can be communicated to the driver. This leads to such a remarkable effect that many drivers accurately call their attention and concentration to the danger foreknowledge/security of the periphery of the vehicle other than the vehicle forwarding direction.

Further, in the radar device having an antenna with a characteristic that radiates an electromagnetic wave over a relatively large range, in a region where the vehicle to be detected is at a relatively short distance and at a close distance positioned just laterally with respect to the subject vehicle, it is difficult to detect the actual distance to the frontmost portion of the vehicle to be detected, that is, a distance to the side of the vehicle to be detected, for example, the rear wheel portion thereof is unavoidably detected. This causes a distance value farther than the actual inter-vehicle distance to be outputted, and for example, there is a possibility that the vehicle to be detected in a region of the blind point which exists just laterally with respect to the subject vehicle and cannot be confirmed by driver's eyes through the door mirror is inaccurately detected, and it is judged that the lane can be changed to another lane according to the detected distance value. This can be expected to be a very dangerous state. In the vehicle periphery monitoring device according to the present invention, in order that appropriate alarm is announced even in such a state, a limit position where the detection of a distance up to the side portion of the vehicle to be detected in a relatively short distance is confirmed through an experiment, and the distance detected by the radar at that position is set as a judgement reference, with the result that processing can be conducted in such a manner that alarm is always announced if the detected distance is equal to or less than the set distance.

As a result, if an other vehicle travels together at a close distance, that the lane on which the subject vehicle travels cannot be changed to another lane can surely be communicated to the driver, thereby making it possible to prevent collision accident.

As described above, the arithmetically operating means measures a distance to an object on the basis of a period of time required since the transmission wave generated from the transmitting circuit is radiated from the antenna until the transmission wave is reflected by the object and received by the receiving circuit through the reception antenna, and also arithmetically operates a relative velocity from the Doppler frequency of a received electric wave or a value of differential from an arithmetically operated distance to judge the risk of collision with the object on the basis of those arithmetically operated results, and announces the judgement result to a driver in response to the risk through the announcing means. With the above structure, the risk of collision with an object which is in the periphery of the subject vehicle can be monitored over the entire region of from the relatively short distance to the relatively long distance.

Also, the arithmetically operating means, if the arithmetically operated distance is equal to or less than a given value, allows the announcing means to announce that the object is at a relatively short distance from the subject vehicle. With the above structure, it can be judged that the object is at a close distance or in such a state as to travel together.

Further, the arithmetically operating means, if the arithmetically operated distance exceeds the given value, judges a safe inter-vehicle distance according to the arithmetically operated relative velocity, and if the arithmetically operating means judges that an actual distance is shorter than the safe inter-vehicle distance, it allows the announcing means to announce that the actual distance to the object is shorter than the safe inter-vehicle distance. With the above structure, the safe inter-vehicle distance judgement can be instantly conducted on the vehicle to be detected which is at the relatively long distance on the basis of the distance and the relative velocity.

Still further, since the arithmetically operating means varies a judgement level of the safe inter-vehicle distance according to a weather condition when judging the safe inter-vehicle distance, if the road surface condition is varied in a bad weather condition such as rain or snow, the safe inter-vehicle distance can be judged in accordance with the varied road surface condition.

Yet still further, since the antenna is made up of a plane patch array antenna, there is provided the directivity which applies the electric wave to the blind point region, thereby being capable of suiting and optimizing the radial pattern.

Yet still further, since the announcing means is disposed on a lower portion of a mirror surface of the door mirror and announces the judgement result by the arithmetically operating means to the driver in response to the risk, the safe judgement can be conducted without moving the field of view while viewing the door mirror.

Yet still further, since the door mirror has a mirror surface on which reflective films of three primary colors which reflect the wavelengths of a visible light but transmits the electromagnetic waves of several G to 100 GHz are deposited, even in the case where the vehicle periphery monitoring device is equipped in the interior of the door mirror, a necessary electromagnetic wave can be transmitted but the visible light can be reflected.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vehicle periphery monitoring device comprising:
   a transmitting circuit for generating a transmission wave;
   an antenna installed on the periphery or in the interior of a door mirror of a subject vehicle for radiating the transmission wave through said door mirror;
   a receiving circuit for receiving a reflected wave from an object which is in the periphery of the subject vehicle by said antenna through said door mirror;
   arithmetically operating means for arithmetically operating a distance and for judging the risk of collision with the object; and announcing means for announcing the judgement result by said arithmetically operating means, wherein said arithmetically operating means, if the arithmetically operated distance is equal to or less than a given value, operates said announcing means to announce that the object is at a relatively short distance from the subject vehicle.

2. The vehicle periphery monitoring device as claimed in claim 1, wherein said door mirror has a mirror surface on which reflective films which reflect the wavelengths of a visible light but transmits the electromagnetic waves of several G to 100 GHz are deposited.

3. The vehicle periphery monitoring device as claimed in claim 1, wherein said arithmetically operating means, if the arithmetically operated distance exceeds the given value, judges a safe inter-vehicle distance according to the arithmetically operated relative velocity, and if said arithmetically operating means judges that an actual distance is shorter than the safe inter-vehicle distance, it operates said announcing means to announce that the actual distance to the object is shorter than the safe inter-vehicle distance.

4. The vehicle periphery monitoring device as claimed in claim 3, wherein said arithmetically operating means varies a judgement level of the safe inter-vehicle distance according to a weather condition when judging the safe inter-vehicle distance.

5. The vehicle periphery monitoring device as claimed in claim 1, wherein said antenna comprises a plane patch array antenna.

6. The vehicle periphery monitoring device as claimed in claim 2, wherein said announcing means comprises an LED which is disposed on a lower portion of a mirror surface of said door mirror and announces the judgement result by said arithmetically operating means to the driver in response to the risk.

* * * * *